(12) United States Patent
Sakamoto et al.

(10) Patent No.: US 7,967,721 B2
(45) Date of Patent: *Jun. 28, 2011

(54) CONTROL APPARATUS FOR AN AUTOMATIC TRANSMISSION

(75) Inventors: Hiroyuki Sakamoto, Hitachinaka (JP); Masahiko Ibamoto, Tokyo (JP); Hiroshi Kuroiwa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/582,775

(22) Filed: Oct. 21, 2009

(65) Prior Publication Data

US 2010/0041514 A1 Feb. 18, 2010

Related U.S. Application Data

(63) Continuation of application No. 11/654,519, filed on Jan. 18, 2007, now Pat. No. 7,628,720.

(30) Foreign Application Priority Data

Feb. 22, 2006 (JP) .................................. 2006-044688

(51) Int. Cl.
*B60W 10/02* (2006.01)
(52) U.S. Cl. ........................................................... 477/5
(58) Field of Classification Search .................. 475/4, 5, 475/150, 207, 208, 209, 218; 74/329, 331, 74/335, 340; 477/3, 5, 143; 180/65.6, 65.7; 903/923
See application file for complete search history.

(56) References Cited

U.S. PATENT DOCUMENTS

| 6,558,283 | B1 | 5/2003 | Schnelle |
| 6,685,591 | B2 | 2/2004 | Hanyu et al. |
| 6,712,734 | B1 | 3/2004 | Loeffler |
| 6,852,054 | B2 | 2/2005 | Tumback et al. |
| 7,083,545 | B2 | 8/2006 | Ibamoto et al. |
| 7,150,698 | B2 * | 12/2006 | Sakamoto et al. ................ 477/5 |
| 7,226,379 | B2 | 6/2007 | Ibamoto et al. |
| 7,331,897 | B2 | 2/2008 | Ibamoto et al. |
| 2002/0189397 | A1 | 12/2002 | Sakamoto et al. |
| 2003/0069103 | A1 | 4/2003 | Ibamoto et al. |
| 2005/0050974 | A1 | 3/2005 | Ibamoto et al. |
| 2005/0120817 | A1 | 6/2005 | Sakamoto et al. |
| 2006/0234827 | A1 | 10/2006 | Sakamoto et al. |

FOREIGN PATENT DOCUMENTS

| DE | 19940288 C1 | 3/2001 |
| EP | 0845618 B1 | 6/1998 |
| JP | 05-240073 | 9/1993 |
| JP | 06-317242 | 11/1994 |
| JP | 2003-072403 A | 3/2003 |
| JP | 2003-113932 A | 4/2003 |
| JP | 2005-114107 A | 4/2005 |

* cited by examiner

*Primary Examiner* — Justin Holmes
(74) *Attorney, Agent, or Firm* — Crowell & Moring LLP

(57) ABSTRACT

A transmission system in a vehicle using a motor to transmit power assists acceleration by generating auxiliary engine power during acceleration in addition to gear changing by the motor. Where acceleration assistance is added, torque transition is conducted along a torque transmission route of dog clutch, second intermediate shaft, motor, first intermediate shaft, and gear position of first intermediate shaft before shifting so as to avoid the torque reduction in uncomfortable shocks and feelings to the driver due to torque reduction when shifting.

14 Claims, 12 Drawing Sheets

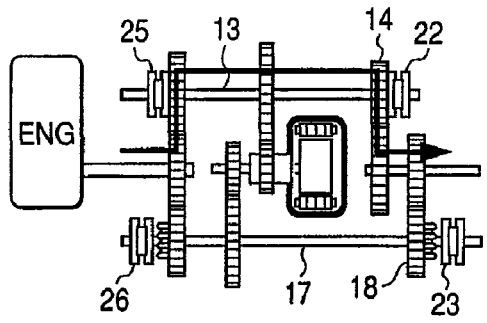
FIG. 4 (a) 1ST- SPEED STATUS
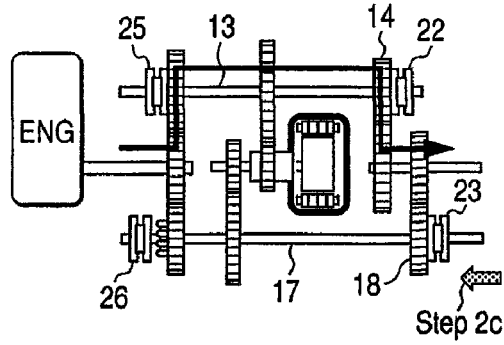
FIG. 4 (b) PREPARATION FOR GEAR CHANGE
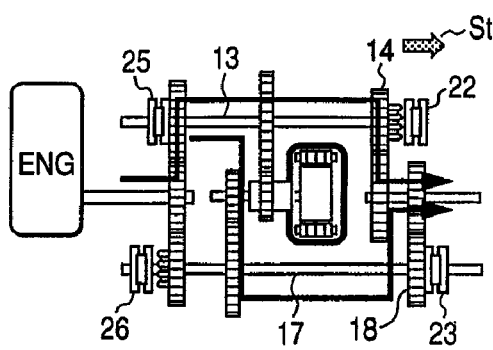
FIG. 4 (c) FIRST TORQUE TRANSITION STATUS
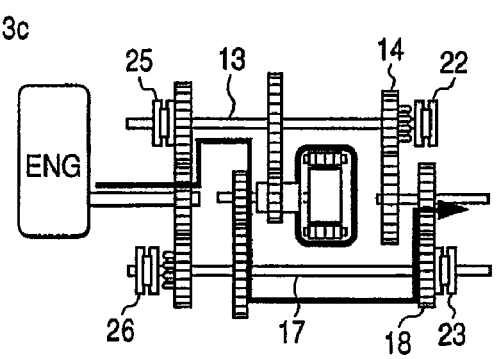
FIG. 4 (d) SPEED TRANSITION STATUS
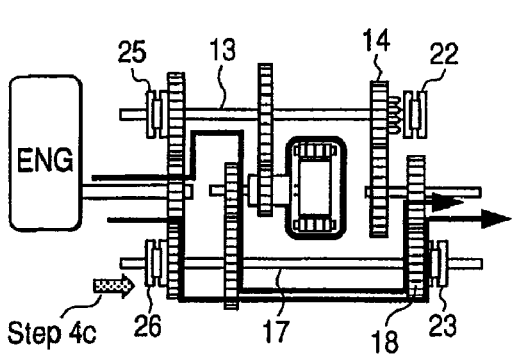
FIG. 4 (e) SECOND TORQUE TRANSITION STATUS
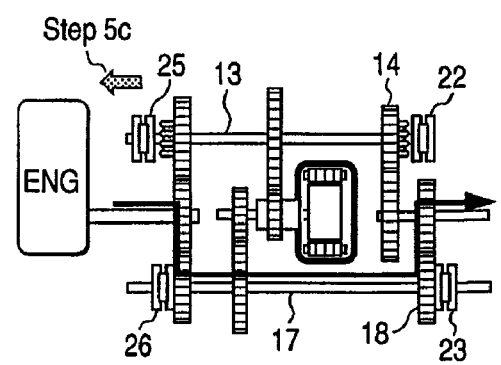
FIG. 4 (f) 2ND- SPEED STATUS

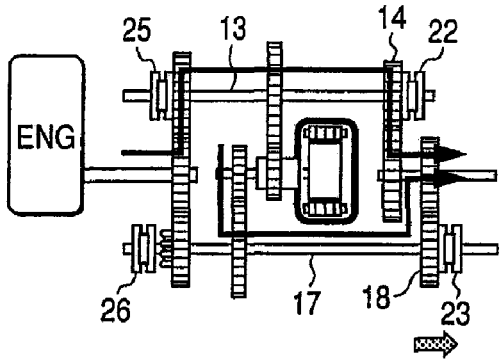
FIG. 8 (a) 1ST- SPEED STATUS
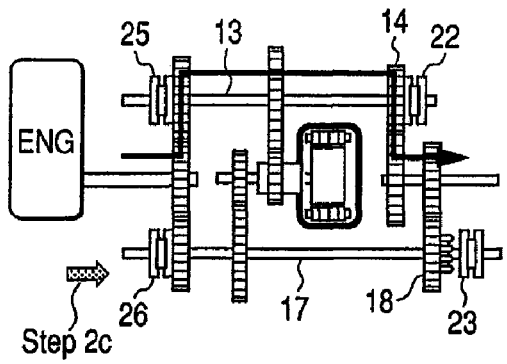
FIG. 8 (b) PREPARATION FOR GEAR CHANGE
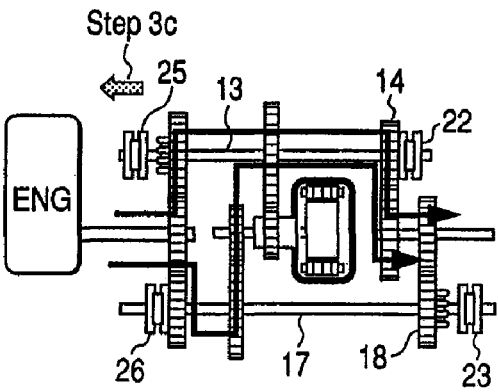
FIG. 8 (c) FIRST TORQUE TRANSITION STATUS
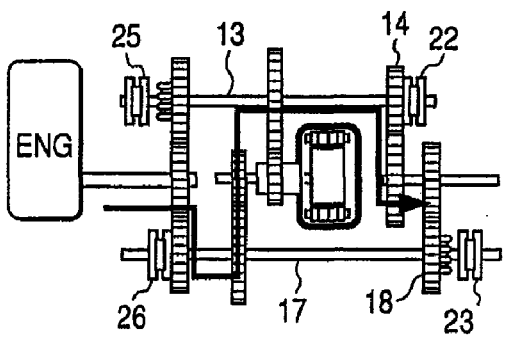
FIG. 8 (d) SPEED TRANSITION STATUS
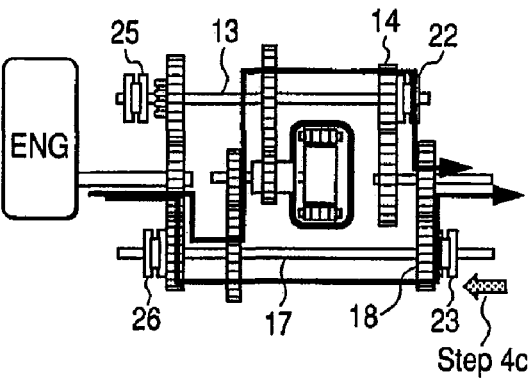
FIG. 8 (e) SECOND TORQUE TRANSITION STATUS
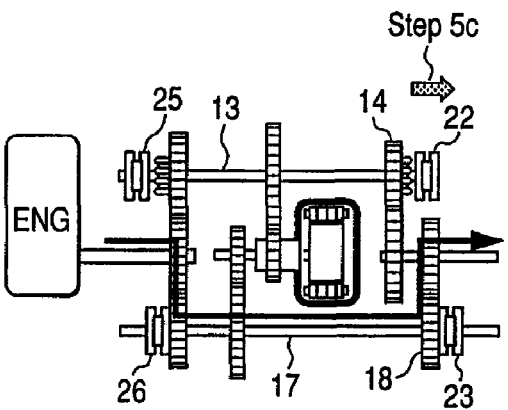
FIG. 8 (f) 2ND- SPEED STATUS

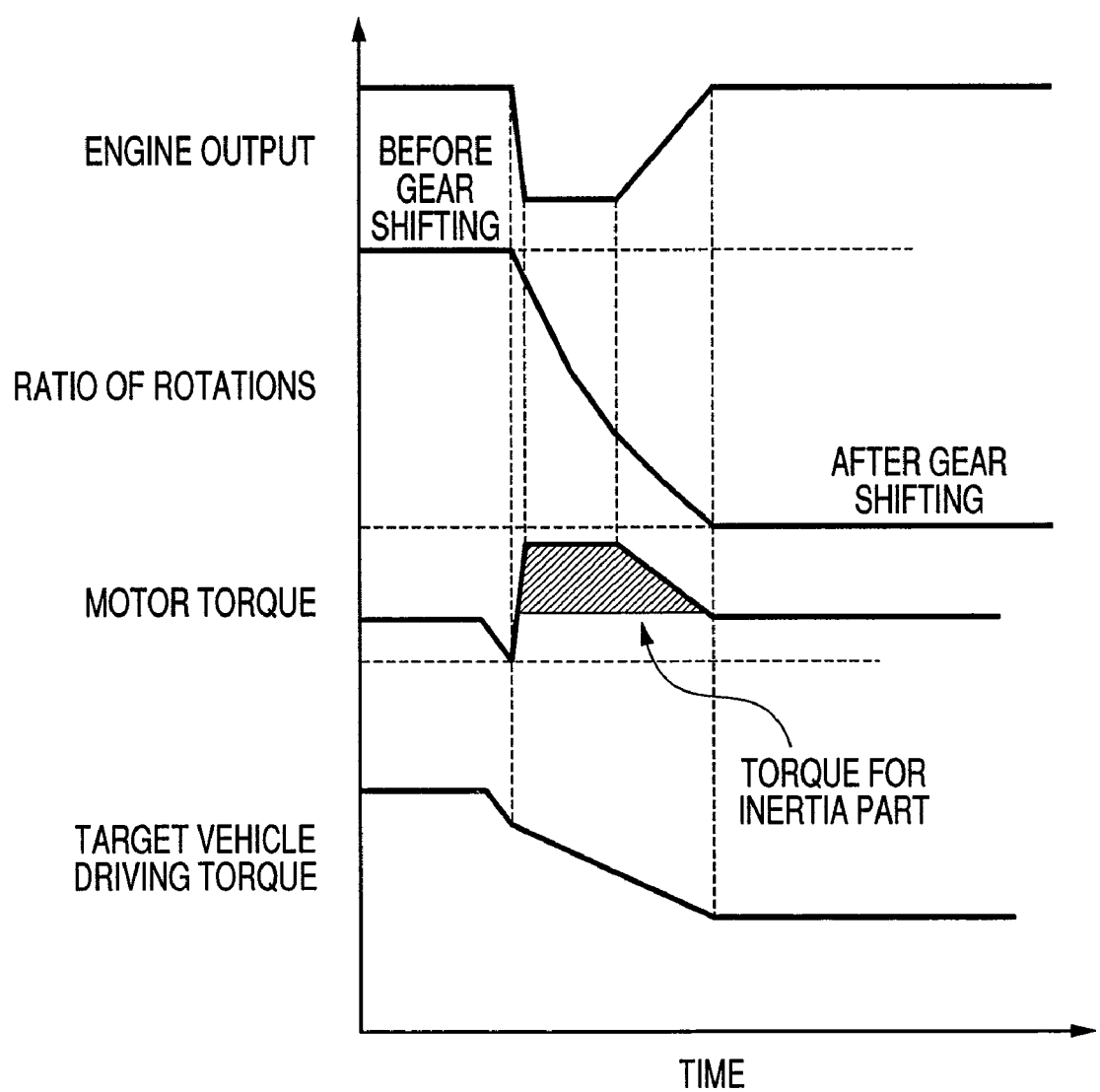

FIG. 11

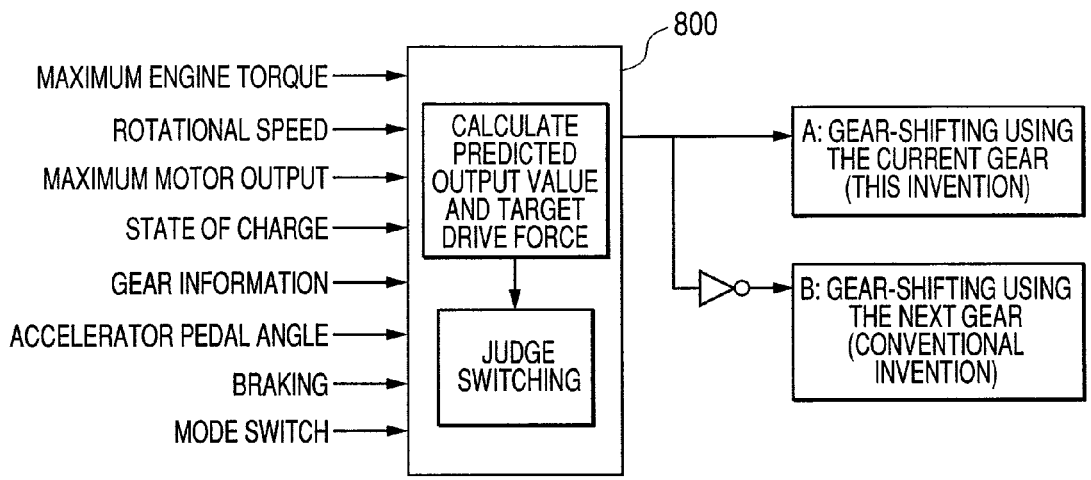

JUDGMENT OF SWITCHING

| STATE OF CHARGE | PREDICTED OUTPUT VALUE | GEAR INFORMATION | ACCELERATOR PEDAL ANGLE AND BRAKING | MODE SWITCH | SWITCHING |
|---|---|---|---|---|---|
| LARGE | — | — | — | — | USE B |
| NORMAL | PREDICTED OUTPUT VALUE < MAXIMUM MOTOR OUTPUT | LOW-SPEED POSITION | ACCELERATION | QUICK MODE | USE B |
| | | | | SMOOTH MODE | USE A |
| | | | DECELERATION | QUICK MODE | USE A |
| | | | | SMOOTH MODE | USE B |
| | | HIGH-SPEED POSITION | — | — | USE A |
| | PREDICTED OUTPUT VALUE ≥ MAXIMUM MOTOR OUTPUT | — | — | — | USE A |
| SMALL | — | — | — | — | USE A |

# CONTROL APPARATUS FOR AN AUTOMATIC TRANSMISSION

CROSS REFERENCE TO RELATED APPLICATION

This application is a continuing application of U.S. application Ser. No. 11/654,519, filed Jan. 18, 2007, which claims priority under 35 U.S.C. §119 to Japanese Patent Application No. 2006-044688, filed Feb. 22, 2006, the entire disclosure of which are herein expressly incorporated by reference.

FIELD OF THE INVENTION

This invention relates to an apparatus and a method of controlling a vehicle, and particularly to control of an automatic transmission.

BACKGROUND OF THE INVENTION

Generally, a conventional automatic transmission uses a planetary gear type or countershaft type transmission mechanism and a general transmission method selectively engages clutches that are individually provided on gear positions of different gear ratios.

To solve this problem, Japanese Patent Laid-open No. 2003-113932, for example, has disclosed a transmission apparatus that actively changes gears by combining a motor with a countershaft type transmission mechanism that is equipped with two input shaft. This mechanism can gradually change gears while keeping the driving force of the vehicle during gear changing. Further, it is possible to assist the engine power for acceleration and improve the power performance of the vehicle by adding power from the motor while the vehicle is running normally.

SUMMARY OF THE INVENTION

During gear shifting, however, the above assistance of acceleration cannot be conducted. Therefore, when a gear shifting is made while acceleration is assisted, the torque drops rapidly. When the acceleration is assisted again after gear shifting, the driver will be bothered by a feeling of strangeness due to torque drop in gear changing.

An object of this invention is to eliminate such an inconvenience, give the driver a good shifting and running feeling, and improve the power performance of the vehicle.

This invention uses, for torque transition, a torque transmission route of an intermediate shaft which is not the current intermediate shaft (used before shifting), the motor, and a shift position (used before shifting).

A method of this invention enables gear changing in various driving conditions while keeping a drive feeling.

BRIEF DESCRIPTION OF THE DRAWINGS

FIGS. 4(a)-(f) show how the torque transmission route and clutch engagement change in the example of FIG. 1 at steps of FIG. 3.

FIGS. 8(a)-(f) show how the torque transmission route is changed and clutches are engaged for the example of FIG. 7.

FIG. 9 shows a torque of an inertia part in gear-shifting of FIG. 7.

FIG. 11 shows a block diagram of an apparatus that switches between the methods of FIG. 6 and FIG. 7.

DESCRIPTION OF THE PREFERRED EMBODIMENTS

An embodiment of this invention will be explained in detail below with reference to the accompanying drawings.

This embodiment is an example of system that uses a differential unit connected to a vehicle-driving power plant, an axle, and a drive shaft of a motor unit for gear-changing and can switch the output of the drive shaft of the motor unit according to the accelerator pedal angle and the running status of the vehicle. (For details of the system, see Patent Document 1.)

Figure 1:
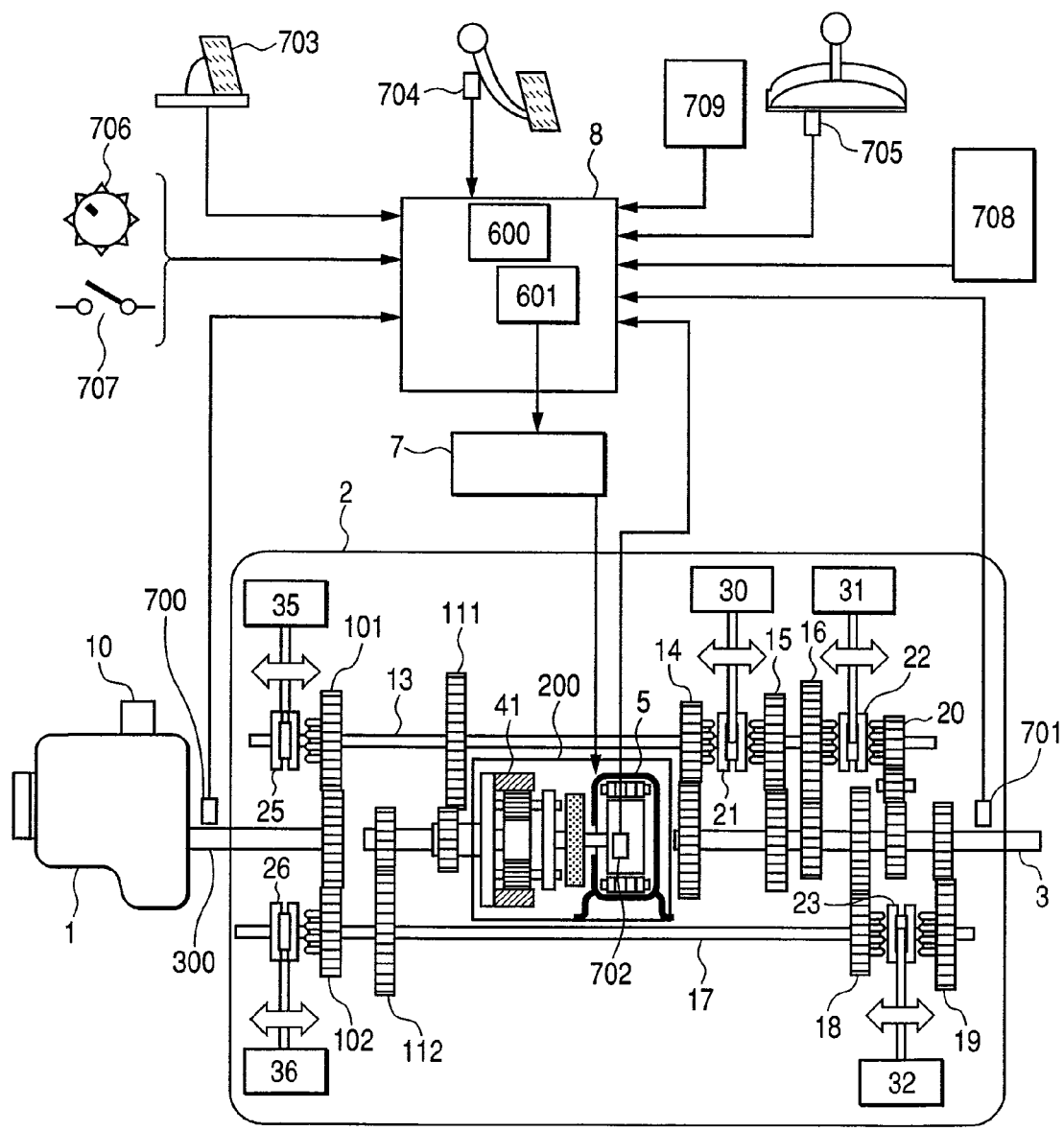
FIG. 1 shows a configuration of a vehicle that is one embodiment of this invention.

FIG. 1 shows a configuration of a vehicle driving system which is an embodiment of this invention.

Vehicle-driving power plant 1 is coupled with input shaft 300 of transmission mechanism 2. Generally, vehicle-driving power plant 1 can be an internal combustion engine or a power unit such as a motor that is equipped with a rotary shaft. Output shaft 3 of transmission mechanism 2 is coupled with an axel (which is not shown in the figure). Input shaft 300 can connect a driving force to first and second intermediate shafts (13 and 17) by dog clutches (25 and 26) that work as input clutches and disconnect a driving force from the intermediate shafts. Direct-coupled gear 101 is used to select and couple first intermediate shaft 13 with input shaft 300. Similarly, direct-coupled gear 102 is used to select and couple second intermediate shaft 17 with input shaft 300. The first and second intermediate shafts are respectively connected to output shaft 2 transmission gears (14, 15, 16, 18, 19, and 20) via dog clutches (21, 22, and 23).

The dog clutches can be coupled with shift actuators (30, 31, and 32) and engaged and disengaged by thrust forces of the actuators. The actuators are general ones for automation and can be driven by a motor or oil pressure. The dog clutches and the actuators will not be described here in detail since they are well known.

One end of the shaft of the motor unit 200 for gear-changing is coupled with first intermediate shaft via motor gear 111. The other end of the shaft of the motor unit 200 is coupled with second intermediate shaft via motor gear 112.

Motor unit 200 for gear-changing consists of motor 5 and planetary gear mechanism 41. The rotary shaft of motor 5 is engaged with the planetary gear of planetary gear mechanism 41. Second intermediate shaft 17 is coupled with a sun gear and the ring gear is coupled with first intermediate shaft 13. With this, the motive energy of motor 5 works on the first or second intermediate shaft. In other words, the motor is differentially connected between the two intermediate shafts so that the motive force of the motor works on the first and second intermediate shaft reversely. For example, if the first intermediate shaft is connected to increase the rotational speed when a positive torque is applied to the motor, the second intermediate shaft is connected to decrease the rotational speed.

Shifting speed controller 601 outputs a driving force signal to motor controller 7 according to input shaft rotation sensor signal 700 sent from a sensor which is provided on input shaft 300 of transmission mechanism 2, output shaft rotation sensor signal 701 sent from a sensor which is provided on output shaft 3, and motor rotation sensor signal 702 sent from motor 5. Shifting controller 8 can control the shifting speed by the ratio of input shaft rotation sensor signal 700 and output shaft rotation sensor signal 701, A shift lever 705, which is operated by the driver for up- or down-shifting, is connected to the shifting controller 8.

Figure 2:
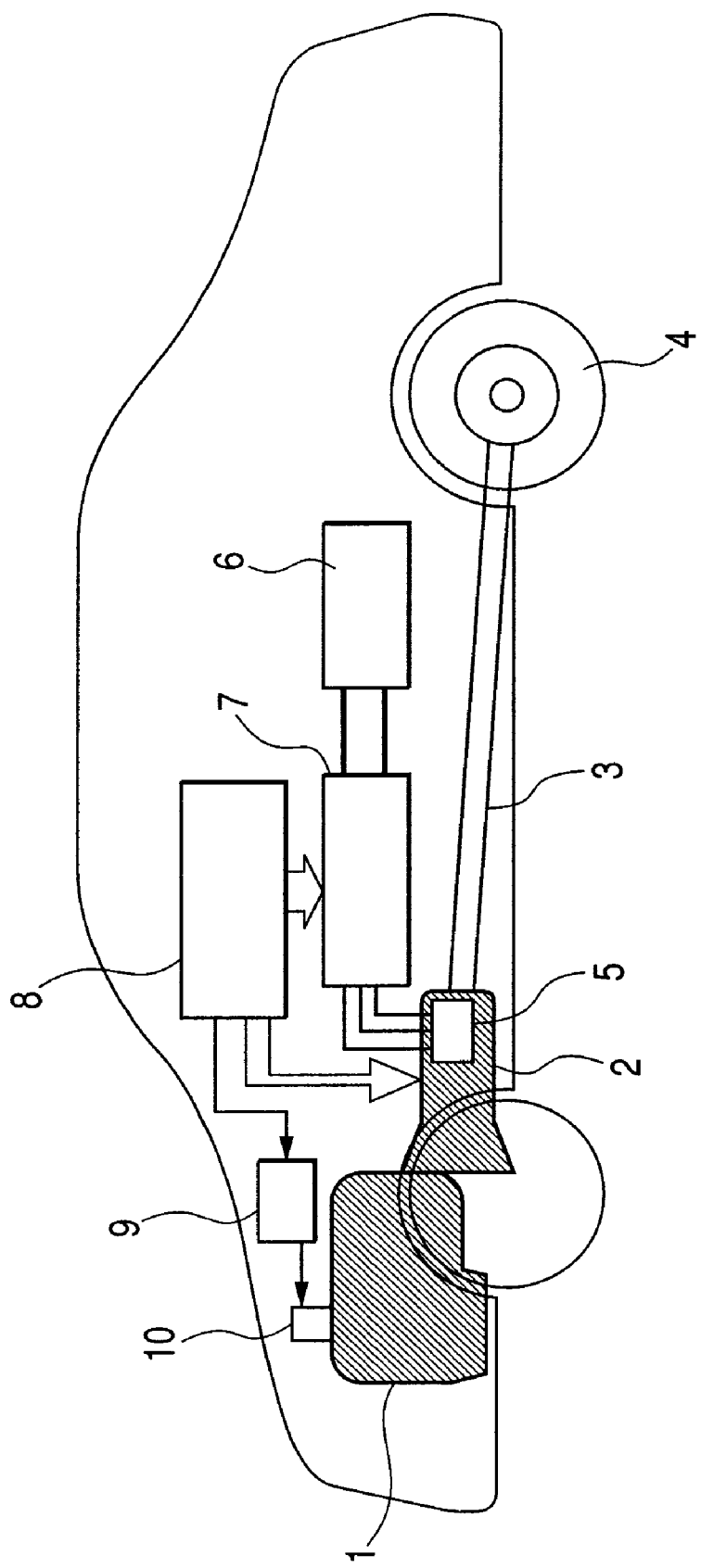
FIG. 2 shows the structure of FIG. 1 on a vehicle.

FIG. 2 shows the structure of FIG. 1 on a vehicle.

Transmission mechanism 2 is connected to vehicle-driving power plant 1 of the vehicle. Output shaft 3 of transmission mechanism 2 drives wheels 4 via differential gears. Transmission mechanism 2 houses motor 5. Motor controller 7 is connected to motor 5. Battery 6 is provided to supply electric power to motor controller 7. Although most of vehicles have used a lead-acid storage battery, it is not enough for this system and will be exhausted quickly since this system repeats charging and discharging so often. Since this system always makes charging and discharging when a gear shifting is made, the state of charge of the battery changes little by a gear changing. Therefore, this system can be equipped with a large capacity capacitor that has been sold well recently. The capacitor can be installed in any method (singly or in parallel with the battery) as long as the battery capacity and the output capacity are enough.

Vehicle-driving power plant 1 is equipped with electronically controlled throttle valve 10 which can control the output of vehicle-driving power plant 1 in response to request signals. For more information of this mechanism, see Patent Document 1.

Shifting controller 8 causes motor controller 7 to control torque and speed of motor 5 and also causes vehicle-driving power controller 9 and throttle valve 10 to control the output of vehicle-driving power plant 1. Further, shifting controller 8 issues commands to shift actuators (30 to 32, 35, and 36) to work.

Next will be explained the basic operation of this apparatus with reference to FIG. 3 to FIG. 5.

Figure 3:
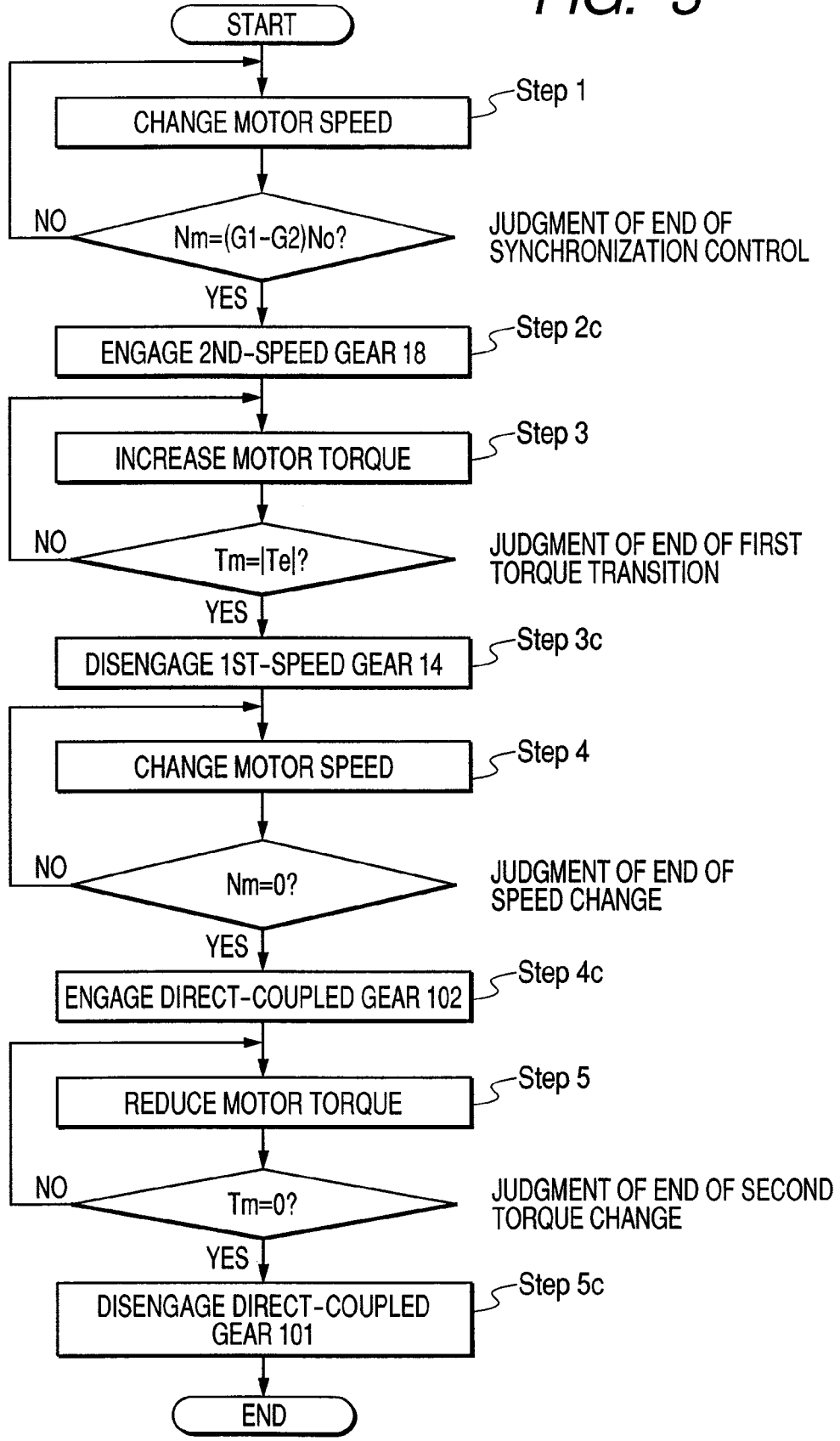
FIG. 3 shows an operational flow of up-shifting in the example of FIG. 1.

FIG. 3 shows an operational flow of up-shifting in the example of FIG. 1. FIG. 3 shows how gears are changed and torque is transferred using an example of 1st-speed to 2nd-speed power-on up-shifting.

FIG. 4 shows how the torque transmission route and clutch engagement change in the example of FIG. 1 at steps of FIG. 3.

Figure 5:
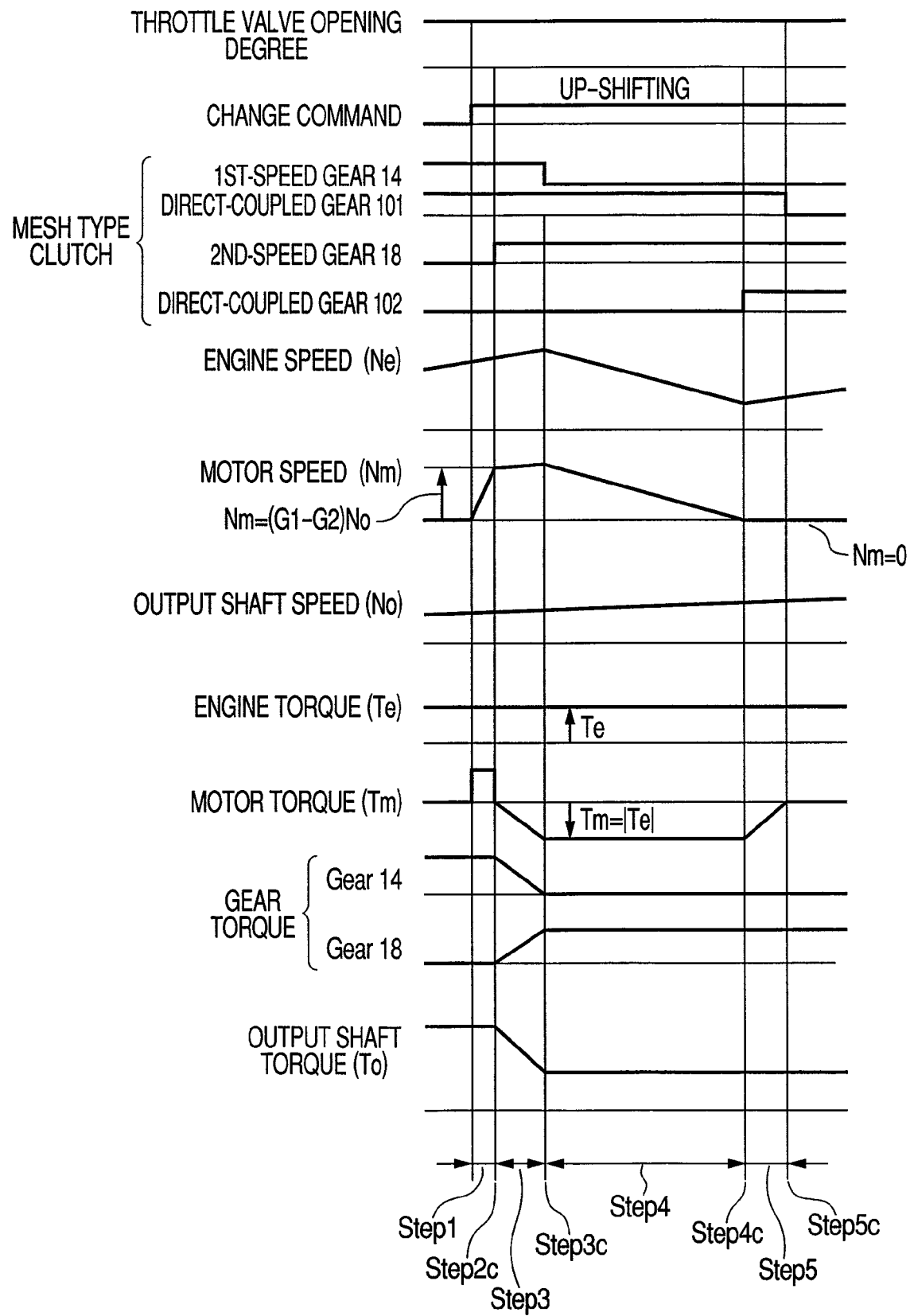
FIG. 5 shows a timing diagram of torques and rotational speeds in the example of FIG. 1.

FIG. 5 shows a timing diagram of torques and rotational speeds in the example of FIG. 1.

At Step 1, the controller controls and varies the speed of motor unit 200 for gear-changing while the vehicle is running with first-speed gear 14 engaged until the synchronization of second gear 18 is detected, When the second-speed gear (shifting gear 18) is engaged (Step 2c), gear-changing motor unit 200 rotates idle at a speed of (N1-N2). In this case, speeds are expressed by the following:

$$N2 = G2 \times No \qquad \text{(Equation 1)}$$

$$N1 = G1 \times No \qquad \text{(Equation 2)}$$

Since N1 is greater than N1, their difference (N1−N2) is a positive value.

Wherein G2 is a gear ratio of the second-speed gears (shifting gear 18) and G1 is a gear ratio of the first-speed gears (shifting gear 14).

At Step 3, when torque of gear-changing motor unit 200 is increased in a negative direction (in which the force works as a driving force on the output shaft and as a load on vehicle-driving power plant 1), the input torque of the second-speed gear increases and the input torque of the first-speed gear decreases. This is a torque transition process called a torque phase and a torque transition from first intermediate shaft 13 to second intermediate shaft 17. Since this process makes torque Tm of gear-changing motor unit 200 negative, input torque of the second-speed gear (shifting gear 18) increases and input torque T1 of the first-speed gear (shifting gear 14) decreases. When Tm becomes equal to −Te, T1=0 and T2=Te.

After this, shifting controller 8 judges whether the torque phase has ended (by that the input torque of first-speed gear 14 is 0). In most cases, however, it is hard to directly detect the input torque of gears, the input torque of gears can be assumed to be zero when the actual torque of the motor is equal to the absolute value of a torque of vehicle-driving power plant 1 (that is when Tm=|Te|). For this purpose, it is necessary to obtain torque Te of vehicle-driving power plant 1 by detection or calculation. However, its detailed method is not described here since it is disclosed by Japanese Patent Laid-open Nos. Hei 5 (1994)-240073 and 6 (1995)-317242.

At Step 3c, the first-speed gear is disengaged. Since T1=0, it is easy to disengage the first-speed gear and the shifting operation gives no influence to the transmission operation. When the first-speed gear is disengaged, the speed of vehicle-driving power plant 1 can be changed.

At Step 4, when shifting controller 8 issues a Change Number Of Revolutions command to gear-changing motor unit 200, the number of revolutions of vehicle-driving power plant 1 changes towards the input number of revolutions of the second-speed gear. This process is a number-of-revolutions-transition process that is called Inertia Phase.

For 1st-speed to 2nd-speed up-shifting, if the number of revolutions of gear-changing motor unit 200 is reduced while Tm=−Te is kept, the number of revolutions of vehicle-driving power plant 1 goes down.

After this, shifting controller 8 judges whether the inertia phase has ended (by that the number of revolutions of vehicle-driving power plant 1 is equal to the input number of revolutions of the next-speed gear).

At Step 4c, shifting controller 8 operates dog clutch 36 to engage direct-couple gear 102. Since the speeds are matched (synchronized), the engagement can be done easily and gives no influence to the transmission operation.

At Step 5, shifting controller 8 issues a Reduce Torque command to gear-changing motor unit 200. When the torque of gear-changing motor unit 200 becomes 0, torque Te of vehicle-driving power plant 1 which is transmitted to G2 via gear-changing motor unit 200 moves from direct-coupled gear 101 to direct-coupled gear 102.

After this, shifting controller 8 judges the end of the second torque phase when torque Tm of gear-changing motor unit 200 becomes 0.

At Step 5c, shifting controller 8 disengages direct-coupled gear 101 and ends shifting. Since Tm=0, the gears can be disengaged and no influence is given to the transmission operation.

When the vehicle speed is down-shifted for example from 2nd-speed to 1st-speed, shifting is performed as follows:

When the vehicle is running at the 2nd speed, direct-coupled gear 102 is coupled with the 2nd-speed gear (shifting gear 18). The controller engages the 1st-speed gear (shifting gear 14), transfers torque to the first speed side by using gear-changing motor unit 200 and disengages the 2nd-speed gear. When the rotational speed of vehicle-driving power plant 1 becomes a speed equivalent to the 1st speed by gear-changing motor unit 200, direct-coupled gear 101 is engaged. Then the torque of gear-changing motor unit 200 is reduced to 0 and direct-coupled gear 102 is disengaged.

In this way, this invention can provide a transmission system that can change gears without a shifting shock. Further, it is possible to add the output of gear-changing motor unit 200 to the output of vehicle-driving power plant 1 by engaging a gear on an intermediate shaft that is not used for transmission of the driving power while gear-shifting is not done, applying torque of gear-changing motor unit 200 so that the rotational speed of vehicle-driving power plant may increase. This can accomplish acceleration assistance to improve the power performance as in a hybrid vehicle.

Figure 6:
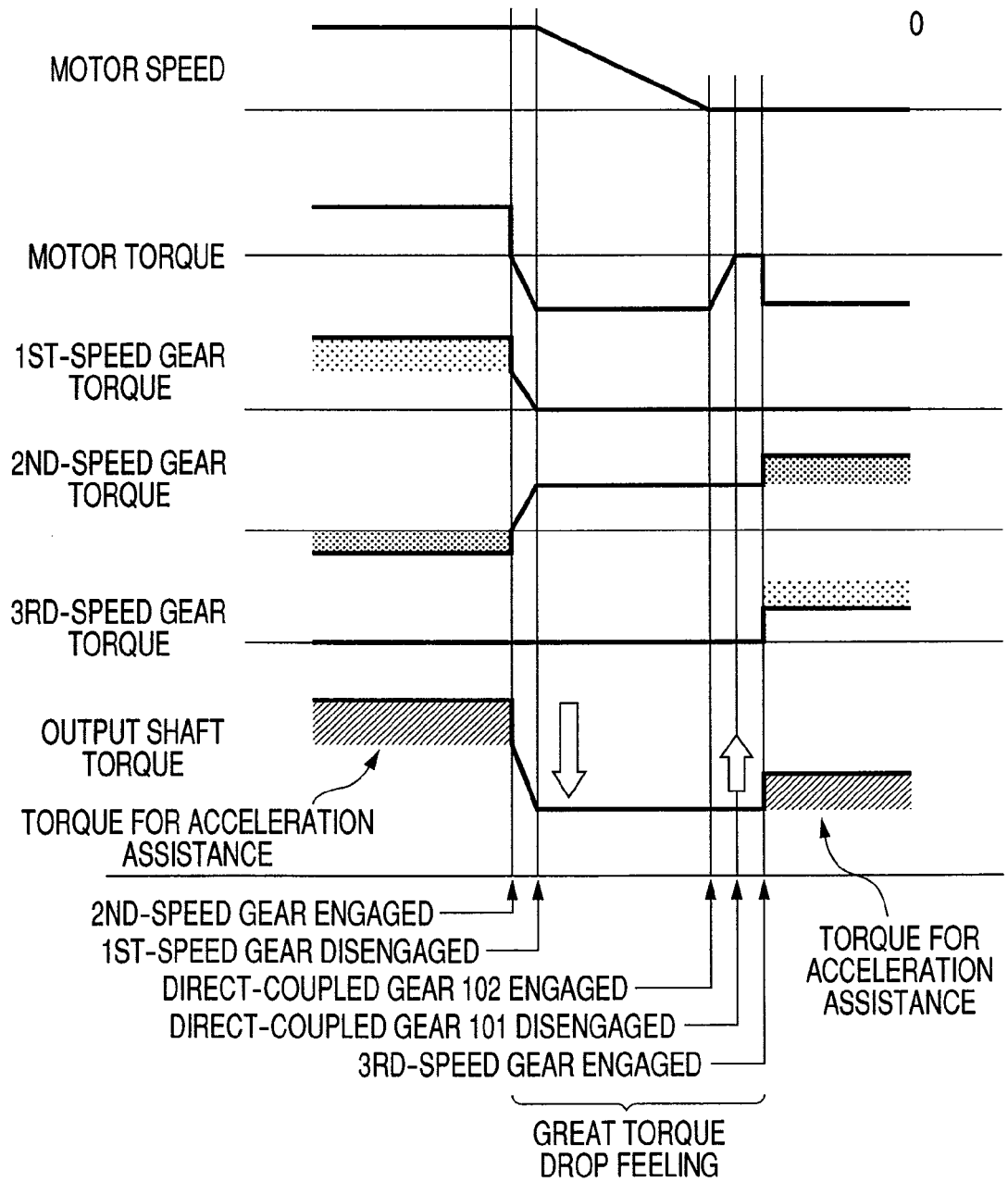
FIG. 6 shows a timing diagram of gear-shifting while the acceleration is assisted in the example of FIG. 1.

However, when up-shifting is done from 1st-speed to 2nd-speed while the acceleration is assisted, the torque for assistance of acceleration vanishes and the driving torque drops since the 2nd-speed gear (after shifting) is used. As the result, shifting shock becomes greater than that in ordinary gear shifting. FIG. 6 shows a timing diagram of gear-shifting while the acceleration is assisted in the example of FIG. 1. If the driving torque increases when the acceleration is assisted again after gear-shifting, the driver will feel the drop of the torque strongly while gear-changing is in progress.

Such a torque drop can be reduced by the following gear-shifting method.

Figure 7:
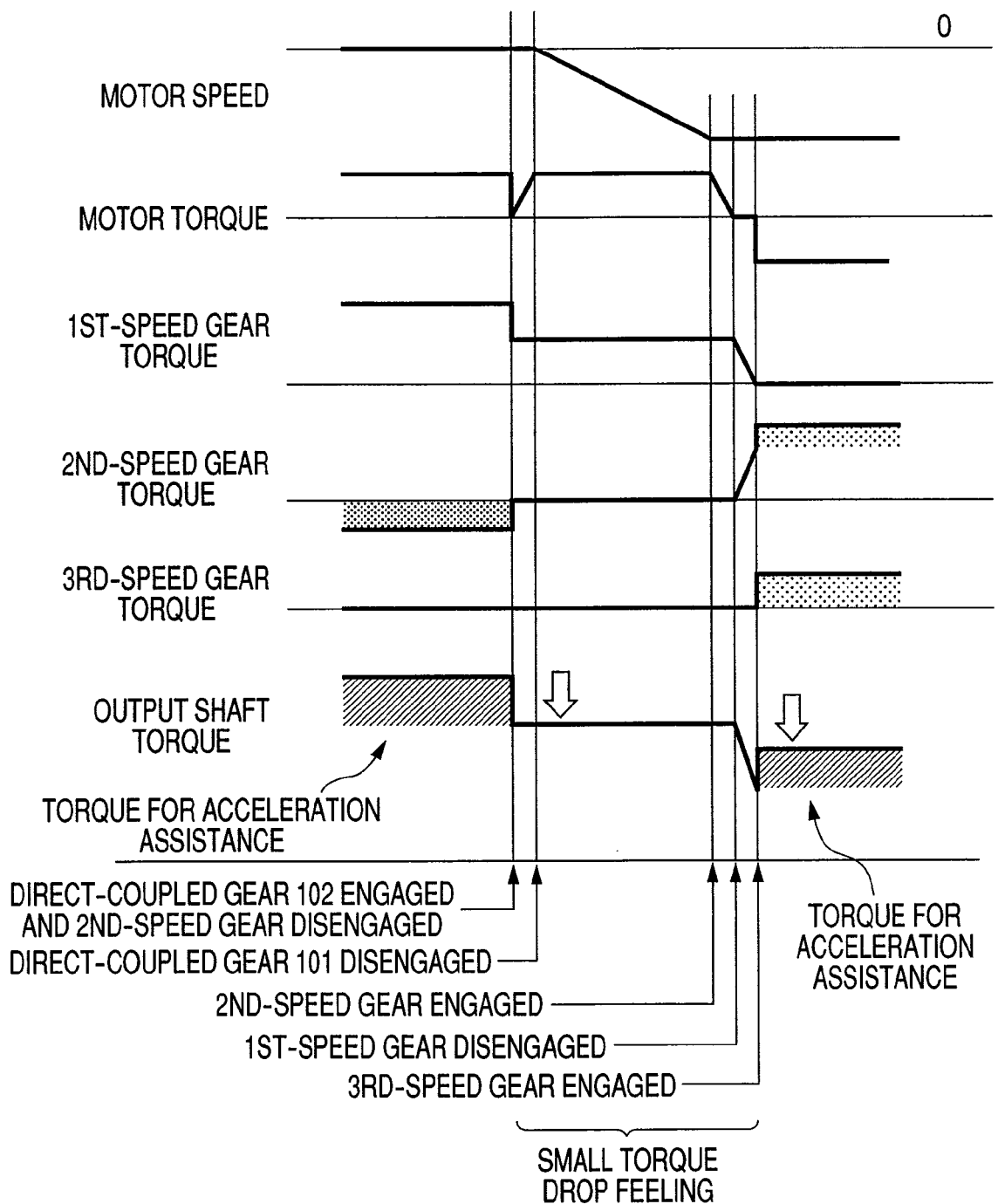
FIG. 7 shows a timing diagram of an up-shifting example of FIG. 1 in which the transmission route of direct-coupled gears is changed in advance.

In the system of FIG. 1, direct-coupled gears 101 and 102 are provided respectively on first intermediate shaft 13 and second intermediate shaft to connect torque from input shaft 300 to the intermediate shafts or disconnect the torque. It is possible to shift using the current gear (before gear-shifting) if the transmission route of the direct-coupled gear is changed in advance by this structure. When the current gear (before shifting) is used, the first-speed gear transmits power to output shaft 3 in an up-shift operation for example when the speed is changed from 1st-speed to 2nd-speed. Accordingly, gear-shifting can be conducted while the driving torque is retained high, that is, without a torque drop. FIG. 7 shows a timing diagram of an up-shifting example of FIG. 1 in which the transmission route of direct-coupled gears is changed in advance.

FIG. 8 shows how the torque transmission route is changed and clutches are engaged for the example of FIG. 7. In FIG. 8(*a*), the 2nd-gear used for transmission of acceleration assisting power is disengaged before synchronization of revolution starts. The 2nd-gear can be disengaged instantaneously when the torque of gear-changing motor unit 200 is made 0. The driving force singly returns to the torque at the 1st speed. If this instantaneous torque drop may give an uncomfortable feeling to the driver, it is possible to gradually reduce the torque for assistance of acceleration. Next, the gear-changing motor unit synchronizes the rotational speed of second intermediate shaft 17 of direct-coupled gear 102 with that of input shaft 300 and direct-coupled gear 102 is engaged. Although direct-coupled gears 101 and 102 are used to transmit power in this transmission system, the intermediate shafts are directly coupled with the output shaft without the gear-changing motor unit between them. So their gear ratio is made 1:1 or a value close to 1:1. Therefore, the target rotational speed of gear-changing motor unit 200 to engage direct-coupled gear 102 becomes 0, the synchronization of rotation can be conducted easily.

The torque transmission route changes as shown in FIG. 8(*c*) when torque is applied from gear-changing motor unit 200 to decrease the rotational speed of vehicle-driving power plant 1 and increase the rotational speed of first intermediate shaft after direct-coupled gear 102 is engaged. When a torque equivalent to the output torque of vehicle-driving power plant 1 is applied, all transmission torques transfer to direct-coupled gear 102 and the transmission torque of direct-coupled gear 101 becomes 0. When the transmission torque of direct-coupled gear 101 comes closer to 0, disengagement of direct-coupled gear 101 will not affect the running of the vehicle. It is possible to transfer revolutions and torques from the input shaft to the output shaft since torque is transmitted from the input shaft to the output shaft via direct-coupled gear 102, gear-changing motor unit 200, and 1st-speed gear 14. In a conventional transmission system, the 2nd-speed gear is used when revolution and torque can be transferred. Therefore, there generates a torque change that is proportional to the difference between gear ratios of first- and second-speed gears. Contrarily, the transmission system of this invention has less torque change because the system uses the current 1st-speed gear (before shifting) when revolution and torque are transferred by a motor.

When direct-coupled gear 101 is disengaged, torque of vehicle-driving power plant 1 must be equal to torque of gear-changing motor unit 200. However, since a dog clutch is used to disengage a direct-coupled gear, direct-coupled gear 102 is disengaged before all transmission torques are transferred to direct-coupled gear 102 if the clutch thrust for disengagement is strong. At the same time, this reduces the driving torque of the vehicle. So it is necessary to know the torque as exactly as possible. In this case, if torque is gradually changed with a small thrust applied to the clutch, direct-coupled gear 101 is disengaged when torque of vehicle-driving power plant 1 is approximately equal to torque of gear-changing motor unit 200. However, since the thrust for disengagement depends upon the frictional status of gears, it is necessary to give vibration to the torque. Such a method has been closed by Japanese Patent Laid-open No. 2005-114107 which has been applied by this applicant, but is also applicable to direct-coupled gears.

Further, this method must increase the rotational speed of gear-changing motor unit for shifting and require energy for assistance of acceleration. Therefore, if the state of charge of batteries is not enough, quick disengagement of direct-coupled gears is required. Further, the rotational speed of gear-changing motor unit is approximately 0 before the direct-coupled gear is disengaged. If the motor is used, a great lock current is required. To prevent this problem and quickly disengage direct-coupled gear 101 by increasing the torque change, shorten a time period to reach a target torque and intensifying the amplitude of the vibration torque when the state of charge of the battery downs or gear-changing motor unit is hot.

If the gear cannot be disengaged, it is possible to suppress reduction of the state of charge of the battery and temperature rise by keeping the small thrust for a preset time period, increasing the thrust, and then shortening the torque application time of revolution 0.

When direct-coupled gear 101 is disengaged, the rotational speed of gear-changing motor unit 200 can be changed as shown in FIG. 8(*d*). Immediately after direct-coupled gear 101 is disengaged, the revolution is approximately 0. Therefore, the torque of gear-changing motor unit 200 must always be applied to increase the rotational speed positively or negatively. If the absolute value of the torque of the gear-changing motor unit exceeds the output torque of vehicle-driving power plant 1, the ratio of rotational speeds of input shaft 300 and output shaft 3 gradually decreases and the gear shifting can be conducted.

Further, when the torque of gear-changing motor unit 200 is increased, the rate of decrease of the rotational speed ratio increases. This quickens the gear shifting. Part of the increasing torque has an effect to improve the power performance.

When the torque of gear-changing motor unit 200 is increased in this way, the vehicle driving torque also increases and the shifting shock becomes greater. To avoid this, it is preferable to control torque of vehicle-driving power plant 1. In many cases, vehicle-driving power plant 1 cannot change the torque instantaneously since the power plant 1 like an internal combustion engine is designed to generate strong output. Contrarily, gear-changing motor unit 200 can mostly change torque instantaneously as in a rotary machine. When the torque of gear-changing motor unit 200 is controlled according to the torque change of vehicle-driving power plant 1, the control performance can be increased and quick gear shifting without a shifting shock can be obtained.

As described above, if a driving force changes, a smooth shifting feeling may not be obtained even when a means is used to improve a shifting time period and a driving force during gear-shifting. So it is possible to determine the torque of gear-changing motor unit 200 and the torque of vehicle-driving power plant 1 from a target driving torque by the driving force before and after gear shifting.

FIG. 9 shows a torque of an inertia part in gear-shifting of FIG. 7. As seen from FIG. 9, it is very important that the target driving torque changes as linearly as possible when the driving force changes from the status in which the acceleration is assisted (before shifting) to the status in which assistance of acceleration is added (after shifting). The target driving toque can be easily calculated if a driving force before shifting, a driving force after shifting, and a torque change during shifting are known to change the target driving force as shown in FIG. 9. First, the torque of vehicle-driving power plant 1 is determined from this target driving torque. The torque can be changed according to the shifting speed. In other words, decrease the torque when it is desired to speed up shifting or increase torque when it is desired to change gears slowly. Next, if the torque of vehicle-driving power plant 1 does not decrease, the output torque of gear-changing motor unit 200 should be equal to the output torque of vehicle-driving power plant 1 since the current gear (before shifting) is used. When the torque of vehicle-driving power plant 1 is reduced, at least the difference between the target driving torque and the torque of vehicle-driving power plant 1 must be added to the torque of gear-changing motor unit 200 considering the inertia moment. This is because part of torque of gear-changing motor unit 200 is used to decrease the rotational speed of vehicle-driving power plant 1 since the rotational speed of vehicle-driving power plant 1 decreases and a torque dispersion occurs even when the torque of vehicle-driving power plant 1 decreases and the target driving torque is output by gear-changing motor unit 200. Therefore the torque of gear-changing motor unit 200 must be increased by a torque equivalent to the inertia part of vehicle-driving power plant 1. Although the inertia moment of gear-changing motor unit 200 is ignored here, this inertia moment must also be considered since a rotational change practically occurs also on gear-changing motor unit 200. The inertia moment can be measured easily since the inertia moment is a rotational rate-of-change. The inertia torque can be calculated from the rotational rate-of-change and the inertia moment.

This enables gear-shifting without changing the driving force of the vehicle.

A recent automatic transmission vehicle has a Manual Select function or the like added to its shift lever. This function enables the driver to shift gears at arbitrary timing. When this function is used, it is desirable to positively generate torque changes and rotation changes in shifting assuming that the driver expects speed-changing. Further, when the power performance (that is, the vehicle performance) is increased, the driver will have a good evaluation on the vehicle. So when the Manual Select function is used, it is possible to weaken the torque drop of vehicle-driving power plant 1, output stronger torque from gear-changing motor unit 200, generate rotation changes and torque changes in gear-shifting, and thus increase the power performance of the vehicle.

When the ratio of rotational speeds decreases, the rotational speed of vehicle-driving power plant 1 becomes equal to that of the direct-coupled 2nd-speed gear. FIG. 8(*e*) shows the engagement of 2nd-speed gear 18 in this state. With this, the 2nd-speed gear can transmit power. The gear-shifting is complete when the torque of gear-changing motor unit 200 is put away. (FIG. 8(*f*))

Figure 10:
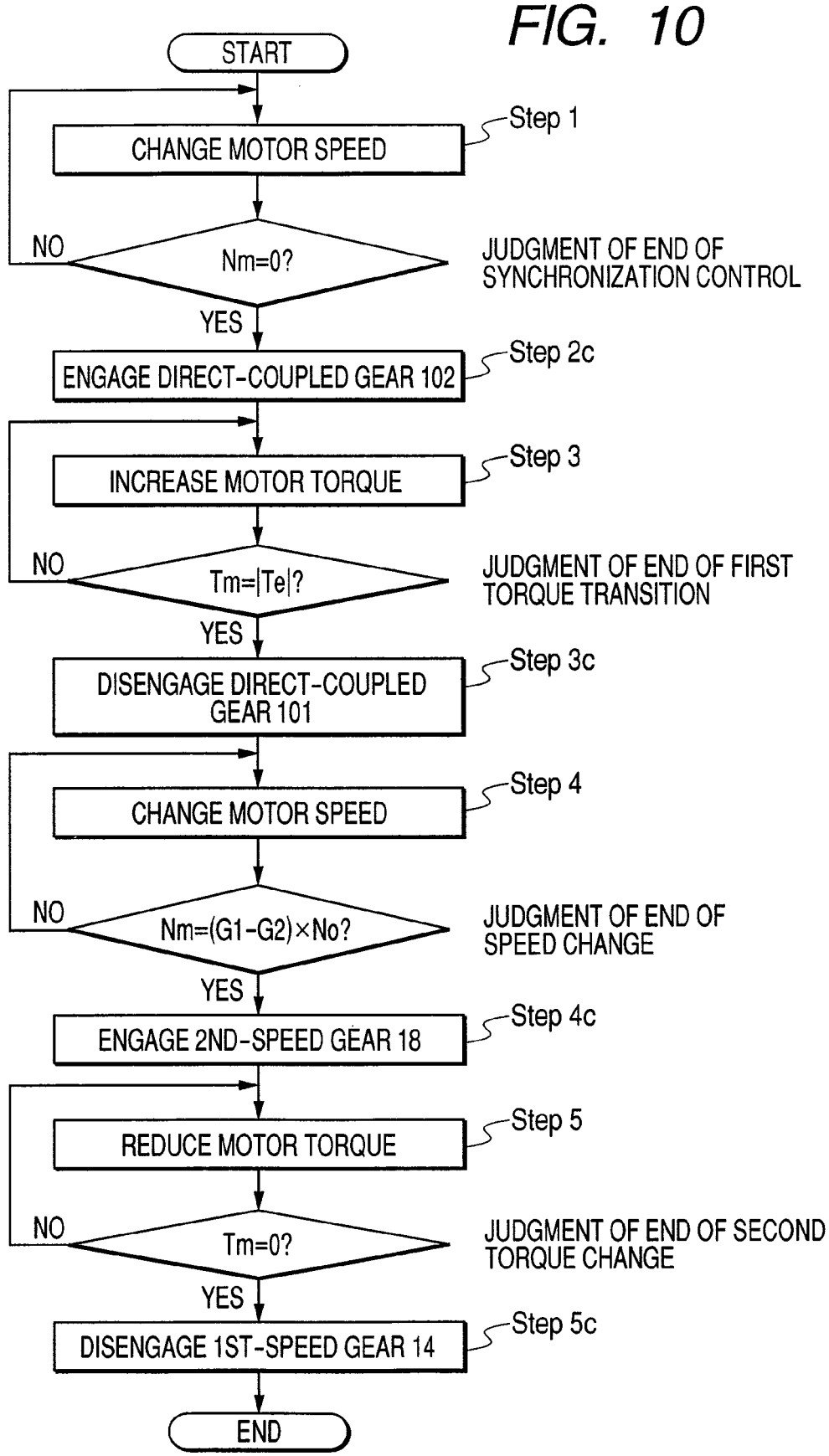
FIG. 10 shows an operational flow of gear-shifting which uses the current gears (before shifting).

FIG. 10 shows an operational flow of gear-shifting which uses the current gears (before shifting). FIG. 10 does not include connection and disconnection of the acceleration assisting torque in accordance with FIG. 3.

Usually, after the 2nd-speed gear is engaged, 1st-speed gear 101 remains disengaged. However, it is possible to keep the 1st-speed gear engaged to apply torque of gear-changing motor unit 200 to the 1st-speed gear. In this case, the torque of gear-changing motor unit 200 works to increase the vehicle speed and the rotational speed of vehicle-driving power plant 1. This can assist the acceleration. Therefore, it is possible to improve the power performance by intensifying the torque. Naturally, it is possible to gradually increase the torque to suppress the shock or uncomfortable feeling in assistance of acceleration.

In some cases, if the acceleration is assisted with the 1st-speed gear engaged, the rotational speed of gear-changing motor unit 200 may be too high and power of gear-changing motor unit 200 may be too small. As the result, the torque is not available. In such a case, it is possible to reduce the rotational speed of gear-changing motor unit 200 and obtain a sufficient power from gear-changing motor unit 200 by disengaging the 1st-speed gear and engaging the 3rd-speed gear. In this case, the torque of gear-changing motor unit 200 must be dropped to about 0 to disengage the 1st-speed gear. However, this removes the torque for acceleration assistance. If this change is made rapidly, the driver may be bothered by a feeling of strangeness. Therefore, it is important to gradually reduce the torque of gear-changing motor unit 200.

In this method, the absolute value of the rotational speed of gear-changing motor unit 200 changes to increase during shifting as shown in FIG. 7. This keeps on requiring energy from the battery unit. If the state of charge of the battery is not enough, power may not be obtained from gear-changing motor unit 200 while gear-shifting is in progress. Therefore, in the case of a low state of charge of the battery, it is necessary to perform the conventional gear-shifting as shown in FIG. 6 without applying this method.

Further, when the rotational speed of gear-changing motor unit 200 increases in the latter half of the gear-shifting, the required output also increases. Therefore, the output capacity of the apparatus must be fully secured. If the output capacity of the output apparatus is limited, it is possible to switch to the conventional gear-shifting (see FIG. 6) predicting the output that is required in the latter half of the gear-shifting.

This prediction is enabled when we can calculate a product of the rotational speed of gear-changing motor unit 200 in the latter half of the gear-shifting by the maximum torque of vehicle-driving power plant 1. The maximum torque of vehicle-driving power plant 1 in an ordinary vehicle can be easily measured. The rotational speed of gear-changing motor unit 200 in the latter half of the gear-shifting is a product of the rotational speed of the output shaft by the difference between the current gear ratio and the next gear ratio. The rotational speed of the output shaft depends upon the vehicle velocity, but a time period required for an ordinary gear-shifting is at most a few seconds and the quantity of acceleration of the vehicle is limited in this short period. Therefore, the predicted output value that is required in the latter half of the gear-shifting can be obtained by the calculated rotational speed of the output shaft which can be accelerated by the maximum torque of vehicle-driving power plant 1 and the maximum torque of vehicle-driving power plant 1. When the acceleration is not used, the rotational speed decreases and the required output goes down. Therefore, this prediction is not required.

Methods of FIG. 6 and FIG. 7 can be switched to optimize the vehicle running according to various running conditions of the vehicle. FIG. 11 shows a block diagram of an apparatus that switches between the methods of FIG. 6 and FIG. 7. For optimum switching between the methods, the apparatus judges running conditions (e.g. maximum torque and rotational speed of vehicle-driving power plant 1, maximum output of gear-changing motor unit 200, and gear information), battery conditions (state of charge of battery and battery status), and other conditions (acceleration, braking, and mode switch state).

Figure 12:
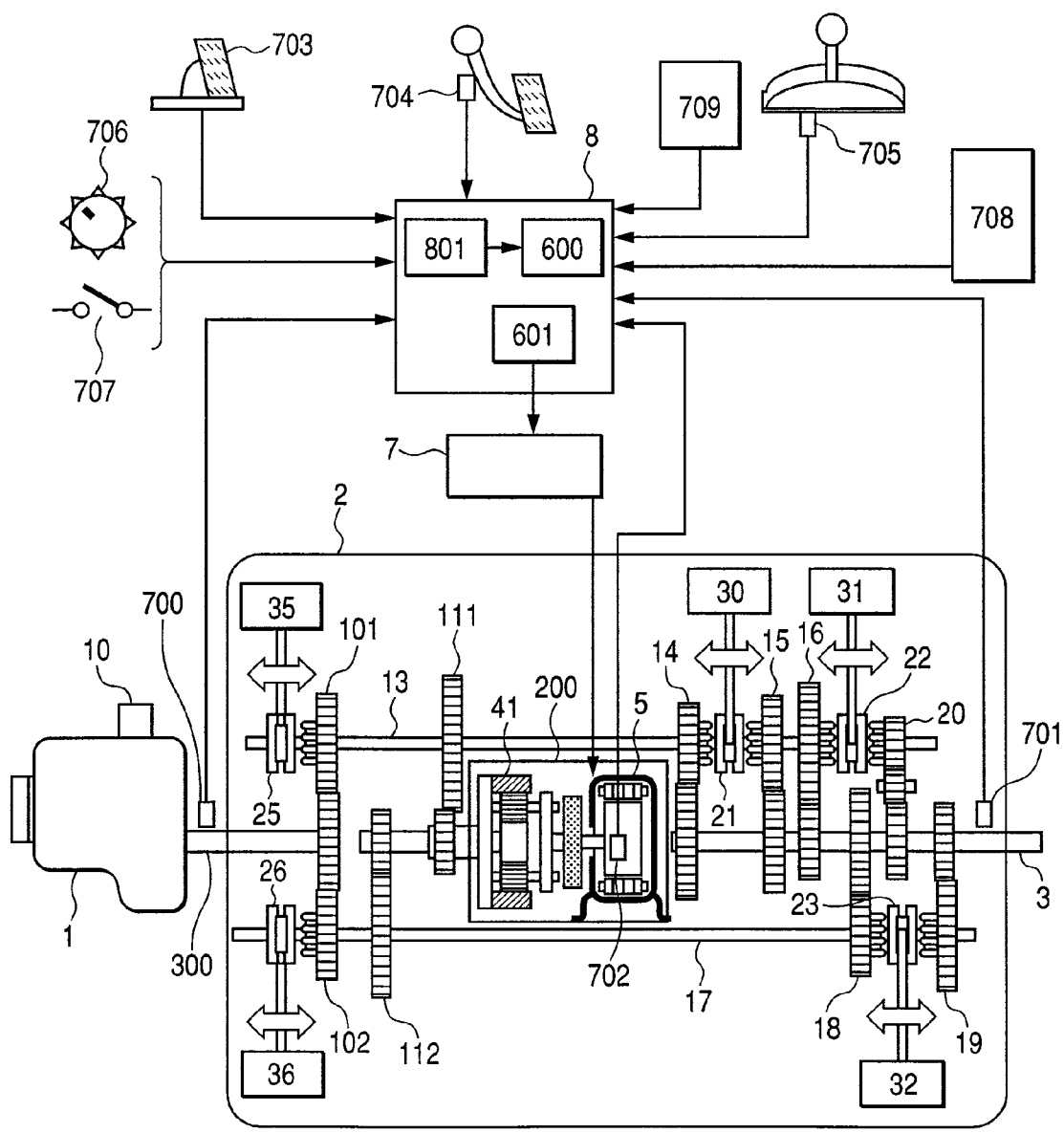
FIG. 12 shows a schematic diagram of the driving system of the vehicle of FIG. 11.

FIG. 12 shows a schematic diagram of the driving system of the vehicle of FIG. 11. In FIG. 12, shifting controller 8 is equipped with the function, but the controller can be provided separately. In this case, it is necessary to provide an input of switching information in shifting controller 8.

This invention relates to a vehicle driving apparatus, but is also available to other industrial equipment as long as the equipment is a transmission unit that controls the rotational speed.

What is claimed is:

1. A control apparatus which transmits torque from a power plant to first and second intermediate shafts respectively via first and second input clutches, transfers torque from the two intermediate shafts to an output shaft via transmission gears and shifting clutches that are respectively provided on the transmission gears, and transfers torque from a shifting position of the first intermediate shaft to a shifting position of the second intermediate shaft by a motor which is differentially connected between the intermediate shafts; wherein a torque transition is conducted along a torque transmission route of the second input clutch, the second intermediate shaft, the motor, the first intermediate shaft, and a gear position of the first intermediate shaft before shifting;

when a shifting command is submitted while torque is transmitted from the power plant to the output shaft via the first intermediate shaft, the transmission gear of the first intermediate shaft, and the shifting clutch on the first intermediate shaft while the first input clutch is engaged and the second input clutch is disengaged, the control apparatus engages the second input clutch of the second intermediate shaft to form the torque transmission route of the power plant, connected to a first input shaft, the second intermediate shaft, a second input shaft connected to the motor, the transmission gear on the first intermediate shaft, and the shifting clutch on the first intermediate shaft, and then disengages the first input clutch, engages the shifting clutch of the transmission gear on the second intermediate shaft, and disengages the shifting clutch of the transmission gear on the first intermediate shaft; and the control apparatus outputs a torque equivalent to the torque of the power plant from the motor before disengaging the first input clutch.

2. The control apparatus of claim 1, wherein, when outputting a torque equivalent to the torque of the power plant from the motor at the start of transmission, the control apparatus applies thrust to disengage the first input clutch, gradually increases the torque from the motor, and thus disengages the first input clutch.

3. The control apparatus of claim 1, wherein the control apparatus changes or vibrates so that the difference between the torque from the motor and the torque of the power plant is inverted when disengaging the first input clutch.

4. The control apparatus of claim 1, wherein the control apparatus increases a rate of change of the torque from the motor to disengage the first input clutch when a state of charge of a battery unit connected to the motor is low, when a temperature of the motor is high, or when a shifting duration must be shortened.

5. The control apparatus of claim 1, wherein the control apparatus increases a range of change in torque vibration to disengage the input clutch when a state of charge of a battery unit connected to the motor is low, when a temperature of the motor is high, or when a shifting duration must be shortened.

6. The control apparatus of claim 1, wherein the control apparatus increases a gear-disengaging thrust to disengage the first input clutch when the difference between the torque from the motor and the torque of the power plant is small and the first input clutch is not disengaged for a preset time period.

7. The control apparatus of claim 1, wherein the control apparatus controls the torque from the motor to increase the speed positively or negatively while one of the input clutches is disengaged.

8. The control apparatus of claim 1, wherein the torque from the motor is increased during shifting to improve power performance.

9. The control apparatus of claim 1, wherein the output of the motor is determined according to the torque of the power plant.

10. The control apparatus of claim 1, wherein the output of the motor is determined according to a target driving torque of a controlled component.

11. The control apparatus of claim 1, wherein the control apparatus is equipped with a shift lever freely operated by a driver for up- or down-shifting and works to decrease the torque of the power plant and increase the torque of the motor when the shift lever is up-shifted or to increase the torque of the power plant and decrease the torque of the motor when the shift lever is down-shifted.

12. The control apparatus of claim 1, wherein the control apparatus holds the torque output from the motor without disengaging the previous shifting clutch at the end of shifting.

13. The control apparatus of claim 12, wherein the control apparatus gradually decreases the torque output from the motor without disengaging the previous shifting clutch at the end of shifting.

14. The control apparatus of claim 1, wherein the control apparatus switches between the torque transition and ordinary torque transition according to a status of a controlled component.

* * * * *